(12) United States Patent
Monsifrot et al.

(10) Patent No.: US 8,762,966 B2
(45) Date of Patent: Jun. 24, 2014

(54) METHOD AND DEVICE FOR CODE OBFUSCATION

(75) Inventors: Antoine Monsifrot, Rennes (FR); Fabien Lahoudere, Laruscade (FR)

(73) Assignee: Thomson Licensing, Boulogne, Billancourt (FR)

( * ) Notice: Subject to any disclaimer, the term of this patent is extended or adjusted under 35 U.S.C. 154(b) by 262 days.

(21) Appl. No.: 12/737,730

(22) PCT Filed: Aug. 17, 2009

(86) PCT No.: PCT/EP2009/060596
§ 371 (c)(1),
(2), (4) Date: Feb. 12, 2011

(87) PCT Pub. No.: WO2010/020603
PCT Pub. Date: Feb. 25, 2010

(65) Prior Publication Data
US 2011/0138351 A1 Jun. 9, 2011

(30) Foreign Application Priority Data
Aug. 21, 2008 (EP) ..................................... 08305495

(51) Int. Cl.
*G06F 9/45* (2006.01)
(52) U.S. Cl.
USPC .......................................... 717/140; 713/187
(58) Field of Classification Search
None
See application file for complete search history.

(56) References Cited

U.S. PATENT DOCUMENTS

2008/0148061 A1 * 6/2008 Jin et al. .......................... 713/187

FOREIGN PATENT DOCUMENTS

CN 1475909 2/2004

OTHER PUBLICATIONS

Lin et al., "Obfuscation of Executable Code to Improve Resistance to Static Disassembly", Oct. 27-31, 2003, ACM, CCS'03.*
Kruegel et al., "Static Disassembly of Obfuscated Binaries", May 18, 2004, University of California Santa Barbara, usenix.org.*
Collberg et al., "Dynamic Path-Based Software Watermarking", ACM Sigplan Notices, ACM, vol. 39, No. 6, New York, NY, Jun. 1, 2004, pp. 112-113.
Search Report Dated Nov. 17, 2009.

* cited by examiner

*Primary Examiner* — Li B Zhen
*Assistant Examiner* — Sen Chen
(74) *Attorney, Agent, or Firm* — Jeffrey D. Carter

(57) ABSTRACT

Compiled computer code comprising computer code instructions organized in a plurality of basic blocks is obfuscated by replacing a jump instruction in a first basic block with a function call with at least one parameter, wherein the function call when executed determines the address of the next function to execute in dependence on the parameter; inserting into the compiled computer code an instruction that allocates a value to the parameter, the value being such that the address determined by the function call corresponds to the address of the replace jump instruction. The allocation function is inserted into the computer code in a second basic block, different from the first basic block, preferably using information from a control flow graph. This can ensure that the obfuscated code cannot be disassembled without information from the CFG, while the CFG cannot be generated from the obfuscated code. Also provided is a device for code obfuscation.

7 Claims, 4 Drawing Sheets ized in a plurality of basic blocks. A jump instruction in a first basic block is replaced with a function call with at least one parameter, wherein the function call, when executed, determines the address of the next function to execute in dependence on the parameter. An instruction that allocates a value to the parameter is inserting into the compiled computer code, the value of the parameter being such that the address determined by the function call corresponds to the destination address of the replaced jump instruction. The allocation instruction is inserted into the computer code in a second basic block that is different from the first basic block and intended to be executed before the first basic block.

METHOD AND DEVICE FOR CODE OBFUSCATION

This application claims the benefit, under 35 U.S.C. §365 of International Application PCT/EP2009/060596, filed Aug. 17, 2009, which was published in accordance with PCT Article 21(2) on Feb. 25, 2010 in English and which claims the benefit of European patent application No. 08305495.7, filed on Aug. 21, 2008 and European patent application No. 08305736.4, filed on Oct. 27, 2008.

FIELD OF THE INVENTION

The present invention relates generally to software, and in particular to obfuscated software.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

In "Obfuscation of Executable Code to Improve Resistance to Static Disassembly", 10th ACM Conference of Computer and Communications Security (CCS), pages 290-299, October 2003, Linn and Debray suggest confusing disassemblers using two main techniques. The first technique is the insertion of junk code bytes inserted in places that are unreachable during normal run-time execution. The second technique uses a branch function to modify regular procedure calls. Somewhat simplified, the branch function determines the target in dependence on the value of a function, such as the hash value over the location of the call instruction. At run-time, this location may be easily determined from the top of the stack. In addition, the branch function also modifies the return address by an offset, which makes it possible to fill the intervening space with junk code.

In "Proceedings of the 13th USENIX Security Symposium", San Diego, Calif., USA, Aug. 9-13, 2004, Kruegel et al. proposed a solution to overcome the obfuscation presented by Linn and Debray. The authors observed that Linn and Debray's branch function essentially is a procedure that the address after the call instruction that is passed on top of the stack as input parameter. Then, the branch function is independent of dynamic input, it may be simulated, as its output depends on the single input parameter and some static lookup tables present in the binary's initialised data segment. The offset may thus be calculated, which enables the disassembler to skip the junk code and to continue from the next valid instruction.

The skilled person will appreciate that there is a need for an obfuscation method that is resistant against the disassembly technique provided by Kruegel et al.

In US 2006/0253687, Jakubowski and Jacob present a code obfuscation method that, among other things, uses branch functions to decide what instruction to jump to. A difference with regard to Linn and Debray is that Jakubowski and Jacob's method uses functions that take dynamic input, which makes it very difficult, if not impossible, to disassemble the code statically.

C. Collberg et al. presented a similar solution in Section 4 of "Dynamic Path-Based Software Watermarking", ACM Sigplan Notices, ACM, Association for Computing Machinery, New York, N.Y., US, XP009084970. Their solution uses nested branch functions where the 'innermost' function is dynamic as it uses hashing of the return address to generate the new return address.

US 2008/0148061 presents, as prior art, another similar solution in which jumps are replaced by calls to an integrity functions that accesses an entry in a table of data, and hashes the value of the entry to determine the return address.

The present invention provides an improvement upon the method of Linn and Debray that at the same time is an alternative to the other prior art methods. As code obfuscation becomes more effective if a plurality of methods may be used, advantageously combined, the skilled person will appreciate that there is a need for such an alternative solution.

SUMMARY OF THE INVENTION

In a first aspect, the invention is directed to a method of obfuscating compiled computer code comprising computer code instructions organised in a plurality of basic blocks. A jump instruction in a first basic block is replaced with a function call with at least one parameter, wherein the function call, when executed, determines the address of the next function to execute in dependence on the parameter. An instruction that allocates a value to the parameter is inserting into the compiled computer code, the value of the parameter being such that the address determined by the function call corresponds to the destination address of the replaced jump instruction. The allocation instruction is inserted into the computer code in a second basic block that is different from the first basic block and intended to be executed before the first basic block.

In a first preferred embodiment, the jump function is an unconditional jump function.

In a second preferred embodiment, the second basic block is chosen in an execution path between a preceding third basic block that comprises a conditional jump instruction and the first basic block. It is advantageous that information in a control flow graph for the compiled computer code is used to choose the second basic block.

In a second aspect, the invention is directed to a device for obfuscating compiled computer code comprising computer code instructions organised in a plurality of basic blocks. The device comprises a replacement unit adapted to replace a jump instruction in a first basic block with a function call with at least one parameter, wherein the executed function call determines the address of the next function to execute depending on the parameter; an insertion unit adapted to insert into the compiled computer code an instruction that allocates a value to the parameter, the value being such that the address determined by the function call corresponds to the destination address of the replaced jump instruction; and a finding unit adapted to find a second basic, different from the first basic block and intended to be executed before the first basic block, for the insertion unit to insert the allocation instruction into.

In a first preferred embodiment, the replacement unit is adapted to replace an unconditional jump function.

In a second preferred embodiment, the finding unit is adapted to find the second basic block in an execution path between a preceding third basic block that comprises a conditional jump instruction and the first basic block. It is advantageous that the finding unit is adapted to use information in a control flow graph for the compiled computer code to find the second basic block.

In a third preferred embodiment, the replacement unit, the insertion unit, and the finding unit are implemented in at least one processor.

BRIEF DESCRIPTION OF THE DRAWINGS

Preferred features of the present invention will now be described, by way of non-limiting example, with reference to the accompanying drawings, in which.

In the Figures, the represented blocks are purely functional entities, which do not necessarily correspond to physically separate entities. These functional entities may be implemented as hardware, software, or a combination of software and hardware; furthermore, they may be implemented in one or more integrated circuits.

PREFERRED EMBODIMENT OF THE INVENTION

Figure 1:
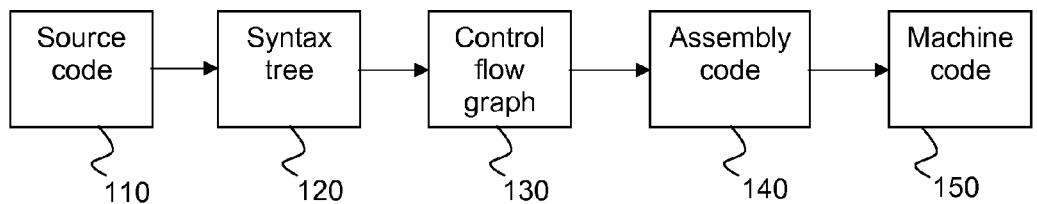
FIG. 1 illustrates the prior art process of compiling software.

FIG. 1 illustrates the prior art process of compiling software. Some basic knowledge of this procedure will aid the comprehension of the description hereinafter. Compilation translates source code 110 to machine code 150 via a number of intermediate steps during which a syntax tree 120, a control flow graph 130 and assembly code 140 are generated.

A main idea of the present invention is to use branch function calls that are more secure than those used by Linn and Debray. As already discussed, their branch functions may be simulated quite easily. While Jakubowski and Jacob secure the branch functions by making them dynamic, they may still be calculated. The present solution secures the branch functions in a different manner, as will be described in detail hereinafter.

Figure 2:
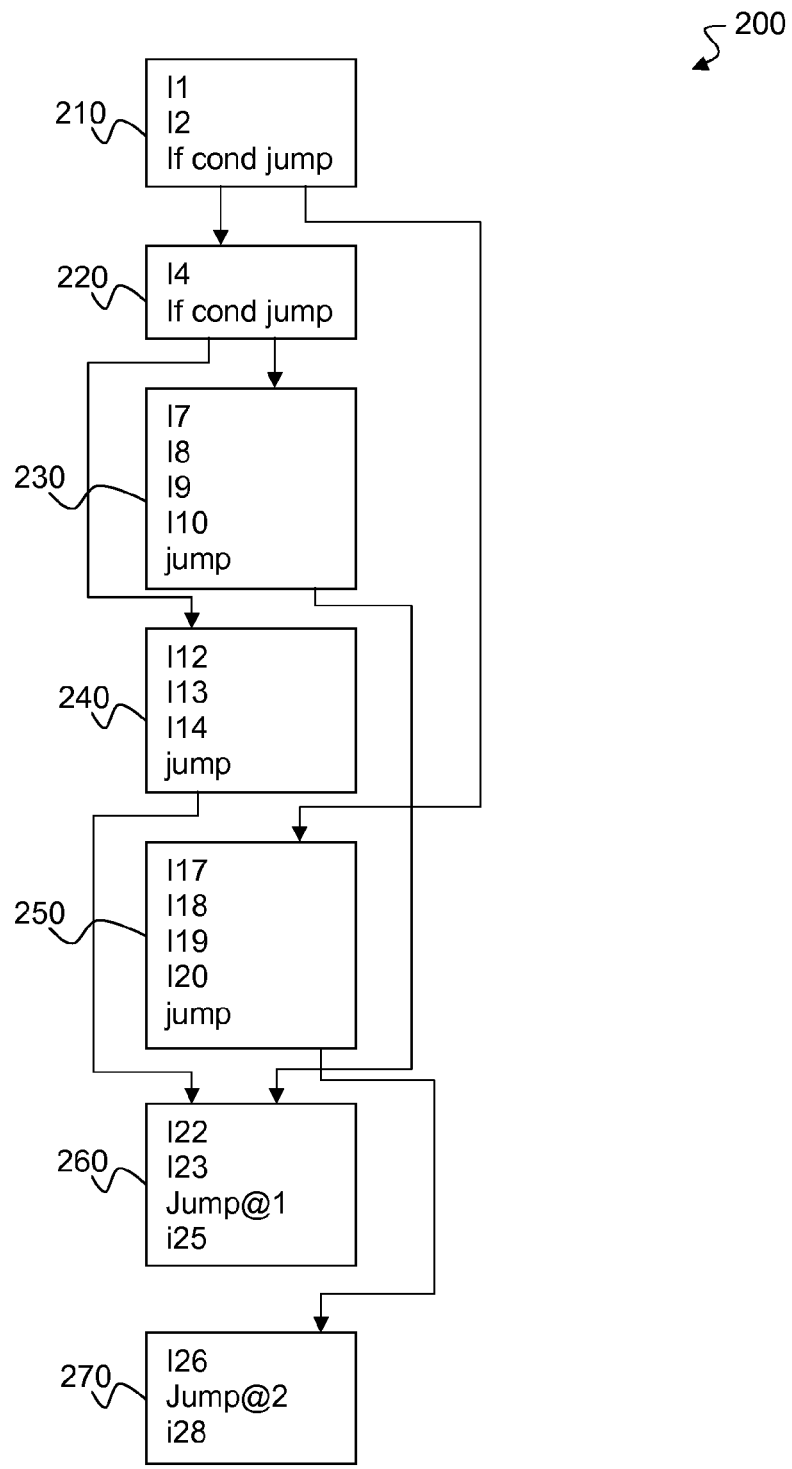
FIG. 2 illustrates obfuscated code according to the prior art.

In order to readily appreciate the solution of the present invention, the prior art obfuscation is first illustrated in FIG. 2. The program code 200 is divided into a number of basic blocks 210-270 following a control flow graph. A basic block may be said to be a set of instructions that will be executed sequentially; as such it ends with a jump function to another basic block. For example, basic block 210 comprises three instructions: I1, I2, and a conditional jump, "If cond jump". All three instructions are executed and, depending on the conditional jump, the execution then continues with instruction I4 in basic block 220 or instruction I17 in basic block 250. There are three possible execution paths through the illustrated code section (the numbers refer to the basic blocks):

A: 210-220-240-260
B: 210-220-230-260
C: 210-250-270.

Basic blocks 260 and 270 each comprises jump function (Jump@1 and Jump@2) and a partial code instruction: i25 and i28 (indicated by minuscule i:s). While it is possible to use one or more entire instructions (in addition to or instead of partial code instructions), it is advantageous to use partial instructions as they will trick a disassembler into misinterpreting at least part of the following 'real' instruction as a function parameter. These two jump functions may be implemented according to either the solution of Linn and Debray—i.e. depending on an address on the stack—or the solution of Jakubowski and Jacob—i.e. a complex function whose value is determined at run-time and is difficult to reverse engineer.

Figure 3:
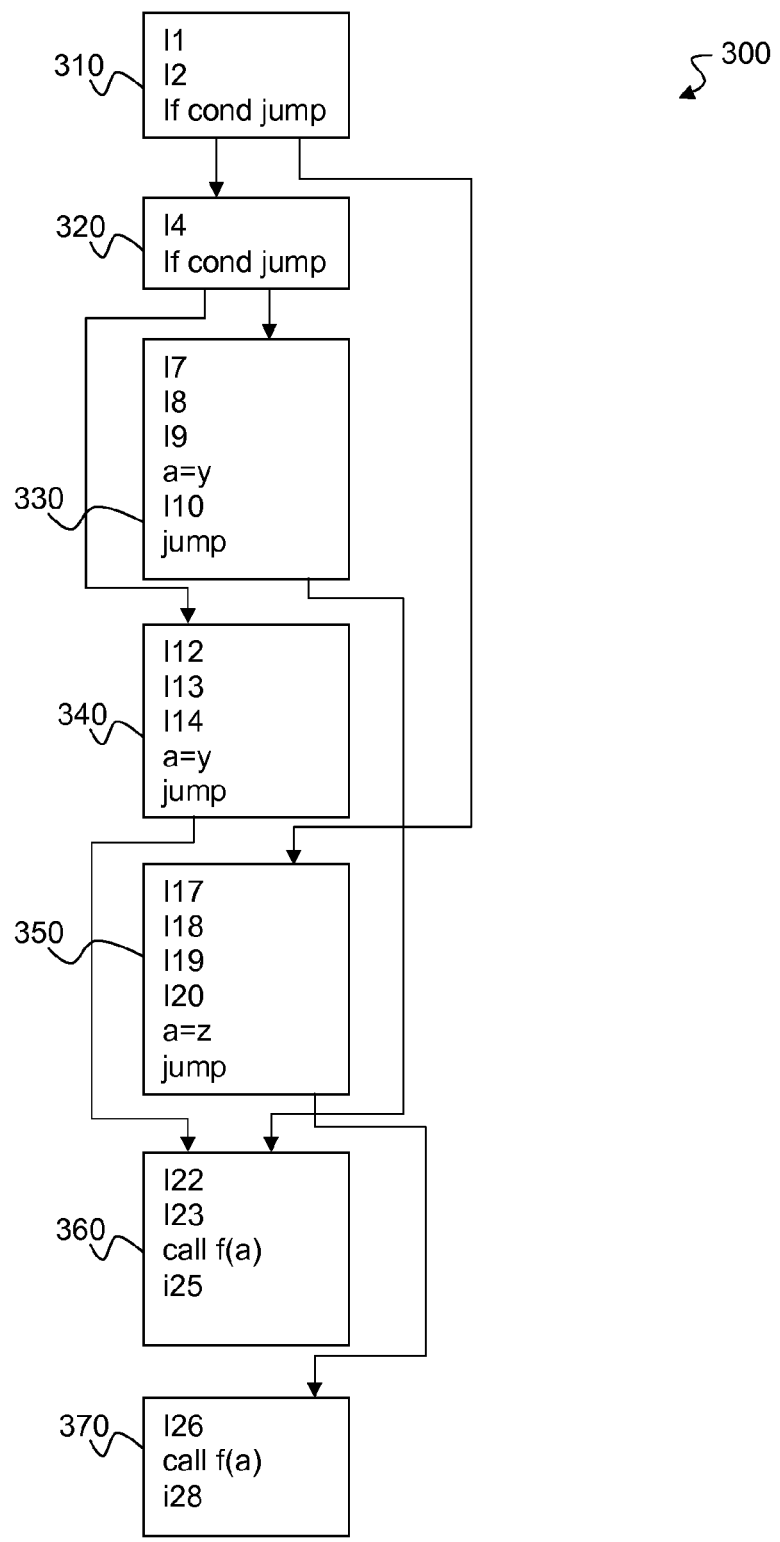
FIG. 3 illustrates obfuscated code according to a preferred embodiment of the invention.

FIG. 3 illustrates obfuscation according to a preferred embodiment of the invention. Apart from some modifications that will be described hereinafter, the program code 300 is identical to the program code 200 of FIG. 2. There are still seven basic blocks 310-370, and basic blocks 310 and 320 are respectively identical to basic blocks 210 and 220.

In basic blocks 360 and 370, however, the jump functions of FIG. 2—Jump@1 and Jump@2—have been replaced with a call to a function having a parameter a as input. With the correct parameter, the function call determines the address of the next instruction to execute in the program flow; in other words, with the correct parameter value, the function call works like the replaced jump function, but not with an incorrect parameter value. It is preferred that the correct parameter value is obtained at this point.

A salient point of the present invention is the use of a control flow graph to secure the calculation of parameter a. This is done by inserting an instruction that allocates a certain value to parameter a in a basic block that is different from the basic block comprising the function call.

For example, execution path A' (310-320-340-360) allocates a value to parameter a in basic block 340 (a=y), basic block 340 being distinct from basic block 360 that comprises the function call.

Similarly, execution path B' (310-320-330-360) allocates the parameter value (a=y) in basic block 330 (also distinct from basic block 360), while execution path C' (310-350-370) allocates the parameter value (a=z) in basic block 350, which is distinct from the basic block 370 with the function call. The skilled person will note that the parameter value is the same (a=y) for the execution paths (A' and B') for which the jump is located in basic block 360. This is preferred, but the values could also be different. The skilled person will appreciate that the parameter value could have been allocated for both execution paths in basic block 320 that is common to the two execution paths, but distinct from execution path C'.

The skilled person will appreciate that a number of variants are possible for allocating the parameter value and for the function calls. First, it is possible to have a plurality of different function calls each having different parameters. Second, the parameter value may also be allocated in a basic block common to more than one execution path; for example, execution paths A' and B' may allocate the parameter value in common basic block 320 (that is not part of execution path C'). Third, the parameter may be allocated a value more than once before the function call; for example, a first allocation may give a first value to the parameter and the second allocation may modify the value, for instance by increasing it by one. Fourth, the allocation may depend on a plurality of factors and may comprise a function such as a hash function.

The skilled person will also appreciate that it is very difficult to reverse engineer the resulting machine code without access to the control flow graph as it is very difficult to find out where the parameters are allocated. It should be noted that the control flow graph usually is not provided with the binary comprising the machine code. At the same time, it will also be appreciated that it is difficult to generate a control flow graph from the machine code as it is difficult to obtain the addresses of the jumps since these are not present in the static code, but calculated during execution.

Figure 4:
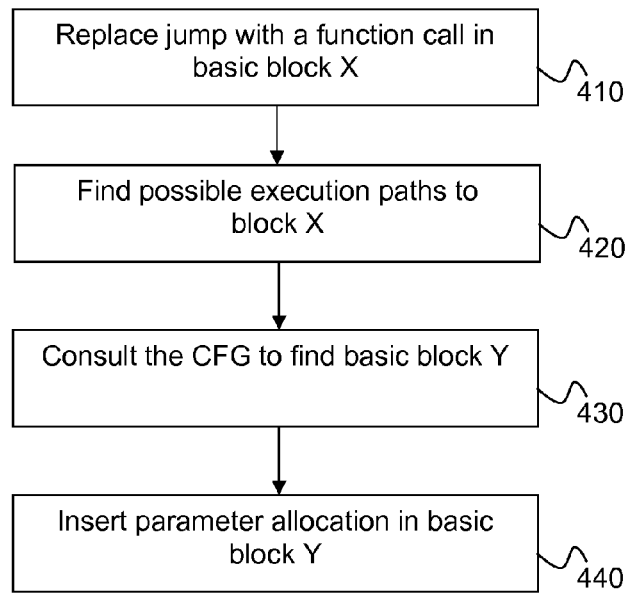
FIG. 4 illustrates a method of code obfuscation according to a preferred embodiment of the invention.

FIG. 4 illustrates a method of code obfuscation according to a preferred embodiment of the invention. In step 410 a jump is replaced by a function call in basic block X, e.g. basic block 360 in FIG. 3. In step 420, the control flow graph (CFG) is used to backtrack from block X to find at least part of the possible execution paths leading to the block. As described hereinbefore, there are two execution paths leading from basic block 310 to basic block 360 in FIG. 3: execution path A' (310-320-340-360) and execution path B' (310-320-330-360).

In step 430 a basic block Y is chosen in at least one (possibly a plurality or all) of the found execution paths. Basic block Y is preferably unique to the execution path, but it is also possible that it is shared by a plurality of execution paths. In case there is a plurality of candidates for basic block Y within an execution path, it is preferred to use one far from basic block X. Continuing the example, candidates for basic block Y for the two execution paths are: A': 310-320-340 and B': 310-320-330. If it is desired that basic block Y be unique to the execution path, then this leaves only basic block 340 for A' and basic block 330 for B'. However, as already mentioned, it is possible to allocate a parameter in e.g. basic block 320, common to both execution paths, and it is also possible to modify or change the parameter value in either of basic blocks 330 and 340, or in both of them.

In step 440, a parameter allocation is inserted in basic block Y. Continuing the example, the parameter is allocated in both execution paths A', "a=y" in basic block 340, and B', "a=y" in basic block 330.

Figure 5:
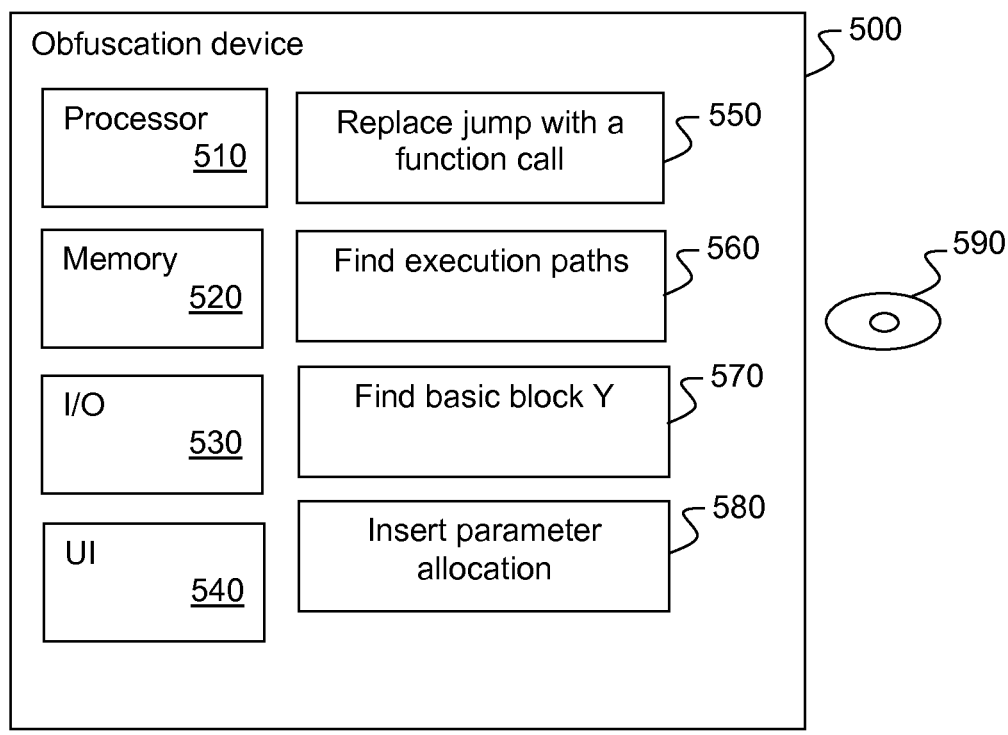
FIG. 5 illustrates a device for code obfuscation according to a preferred embodiment of the present invention.

FIG. 5 illustrates a device for code obfuscation according to a preferred embodiment of the present invention. The device 500 comprises at least one processor (herein "processor") 510, memory space 520, at least one communication unit (I/O) 530 for communication with other devices, and a user interface (UI) 540 for user interaction. Preferably implemented in the processor 510, the device 500 comprises a unit 550 for replacing jumps with function calls (corresponds roughly to step 410), a unit 560 for finding execution paths (corresponds roughly to step 420), a unit 570 for finding candidate basic blocks (corresponds roughly to step 430), and a unit for inserting parameter allocation (corresponds roughly to step 440).

The device 500 preferably also comprises (not shown) units for taking source code and generating a syntax tree 120, a CFG 130, assembly code 140 and machine code 150.

FIG. 5 also illustrates a computer program support 590, such as a CD-ROM or any other suitable support for storing computer code, that stores compiled computer code obfuscated using the method according to the preferred embodiment of the present invention.

It will thus be appreciated that the present invention enables code obfuscation that is resistant to at least static disassembly.

Each feature disclosed in the description and (where appropriate) the claims and drawings may be provided independently or in any appropriate combination. Features described as being implemented in hardware may also be implemented in software, and vice versa. Connections may, where applicable, be implemented as wireless connections or wired, not necessarily direct or dedicated, connections.

Reference numerals appearing in the claims are by way of illustration only and shall have no limiting effect on the scope of the claims.

The invention claimed is:

1. A method of obfuscating compiled computer code comprising computer code instructions organised in a plurality of basic blocks, the method comprising the steps, in a device, of:
   replacing a jump instruction in a first basic block with a function call with at least one parameter, wherein the function call, when executed, determines the address of the next function to execute in dependence on the parameter;
   inserting into the compiled computer code an instruction that allocates a value to the parameter, the value being such that the address determined by the function call corresponds to the destination address of the replaced jump instruction;
   wherein the allocation instruction is inserted into the computer code in a second basic block, different from the first basic block and intended to be executed before the first basic block, and further comprising a step of:
   choosing the second basic block in an execution path between a preceding third basic block that comprises a conditional jump instruction and the first basic block.

2. The method of claim 1, wherein the jump function is an unconditional jump function.

3. The method of claim 1, wherein information in a control flow graph for the compiled computer code is used to choose the second basic block.

4. A hardware device for obfuscating compiled computer code comprising computer code instructions organised in a plurality of basic blocks, the hardware device comprising:
   a replacement unit adapted to replace a jump instruction in a first basic block with a function call with at least one parameter, wherein the function call when executed determines the address of the next function to execute in dependence on the parameter;
   an insertion unit adapted to insert into the compiled computer code an instruction that allocates a value to the parameter, the value being such that the address determined by the function call corresponds to the destination address of the replaced jump instruction; and
   a finding unit adapted to find a second basic block, different from the first basic block and intended to be executed before the first basic block, for the insertion unit to insert the allocation instruction into, wherein the finding unit is adapted to find the second basic block in an execution path between a preceding third basic block that comprises a conditional jump instruction and the first basic block.

5. The hardware device of claim 4, wherein the replacement unit is adapted to replace an unconditional jump function.

6. The hardware device of claim 4, wherein the finding unit is adapted to use information in a control flow graph for the compiled computer code to find the second basic block.

7. The hardware device of claim 4, wherein the replacement unit, the insertion unit, and the finding unit are implemented in at least one processor.

* * * * *